July 26, 1932. R. S. JENNINGS 1,869,261
POCKET
Filed Dec. 10, 1931
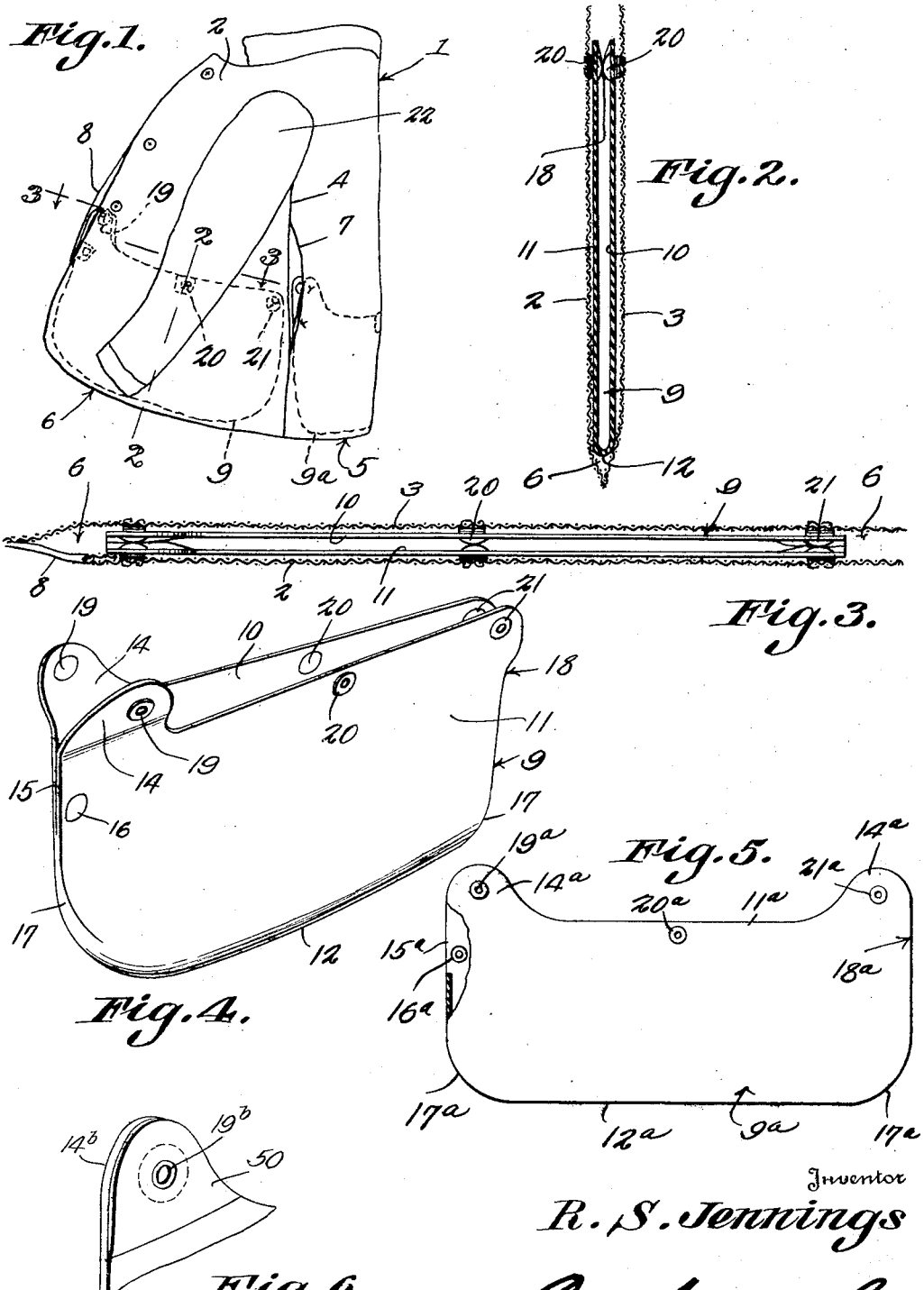
Inventor
R. S. Jennings
By C. A. Snow & Co.
Attorneys Patented July 26, 1932

1,869,261

UNITED STATES PATENT OFFICE

RUBY SKELTON JENNINGS, OF BUTLER, INDIANA

POCKET

Application filed December 10, 1931. Serial No. 580,198.

By way of explanation, it may be stated that it is a disagreeable and disgusting task to wash out the pockets of a hunting coat, because the pockets very often are saturated with blood and otherwise in a filthy condition. This is especially true, because, owing to the fact that one does not like to undertake a disgusting task of the kind alluded to, pockets of a hunting coat often are permitted to become matted with blood and caked with dirt.

The foregoing being understood, this invention aims to provide a pocket for a hunting coat, or for any other coat or garment, so constructed that the pocket may be taken out and cleaned readily, the construction of the pocket being such that no difficulty will be encountered in cleaning it of blood or any other substances which have temporarily accumulated therein. The invention aims to provide novel means for mounting the pocket in the coat, and to provide novel means whereby access may be had to the pocket.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawing:—

Figure 1 shows in perspective, a hunting coat wherein the device forming the subject matter of this application has been embodied;

Figure 2 is a section on the line 2—2 of Figure 1, omitting the sleeve;

Figure 3 is a section on the line 3—3 of Figure 1;

Figure 4 is a perspective view of one of the pockets;

Figure 5 is an elevation of another of the pockets, parts being broken away, and parts being in section.

Figure 6 is a perspective showing a slight modification.

Although the device forming the subject matter of this application may be assembled with garments of many kinds, and with hunting coats of different constructions, there is shown, by way of illustration, a hunting coat 1, including a body 2 and a lining 3, the underarm seams 4 defining, between the lining 3 and the body 2, a rear pocket 5 and side pockets 6. Openings along the underarm seams 4 give access to the pocket 5 and these openings are marked by the numeral 7. Openings 8 near to the forward edges of the coat, give access to the side pockets 6. Hunting coats very often have outside pockets, in addition to those mentioned, but the outside pockets are omitted in the present disclosure, for the sake of clearness.

In carrying out the invention, I provide an elongated sack 9, preferably made of one-piece, and constructed of rubber or rubber compound, the sack, therefore, being impervious, and being of such a construction that it can be cleaned readily of the noisome material or offal, likely to accumulate in a hunting coat pocket. The sack 9 comprises an inner wall 10 and an outer wall 11, connected by a bottom 12. The bottom 12 is convexed transversely, as shown in Figure 2, and is stiff enough so that it will hold the form shown in Figure 2. Owing to this construction, the bottom can be cleaned out readily. The lower ends 17 of the sack are constructed in the same way, up to the lower end of a slit 15 which exists in the forward end of the sack between the walls 10 and 11, and up to the place where the reference numeral 18 is applied at the rear end of the sack 9. Above the place where the numeral 18 is applied in Figure 4, at the rear end of the sack, walls 10 and 11 are not connected together. Owing to this circumstance, and owing to the presence of the slit 15 at the forward end of the sack, the walls 10 and 11 of the sack can separate readily along with the lining 3 and the body 2 of the coat, to permit objects of any kind to be introduced into the sack. A little above the lower end of the slit 15, the walls 10 and 11 of the sack are connected by a separable fastener 16, which may be a snap fastener. This fastener 16 is not used to connect the sack to the coat. At its forward end, and at its upper end, the sack has flexible tabs 14 which project upwardly from the walls 10 and 11, the walls 10 and 11 being flexible also. The sack is located in the pocket 6, and snap fasteners 19 on the tabs 14 connect one tab to the body 2 of the coat, and the opposite tab to the lining 3 of the coat. The snap fasteners 19 do not hold the tabs 14 together. The walls 10 and 11 of the sack are provided, intermediate their ends, and near to their upper edge, with snap fasteners 20. The fasteners 20 connect with the walls 10 and 11 of the sack to the lining 3 and to the body 2, but do not cooperate to hold the walls 10 and 11 closed together. At the rear ends of the walls 10 and 11, at or near the upper edge of the said walls, there are snap fasteners 21, or equivalent devices, which connect the wall 11 to the body 2 of the coat and the wall 10 to the lining 3. The tabs 14 extend upwardly along the front edges of the coat, at the opening 8, and the lower end of the slit 15 preferably coincides with the lower end of the opening 8. The reason for having the tabs 14 is to protect the coat, above the upper edge of the sack, at the opening 8, without having the sack proper too high, and capacious, and also to avoid the use of too much material, and as well as having the pocket and the sack extend up so far that when filled with material, it will interfere with the movement of the arms of the wearer in the sleeves 22 of the coat.

In Figure 5 of the drawing, parts hereinbefore described have been designated by numerals previously used, with the suffix "a". In this form of the invention, the sack 9a has tabs 14a at each end, because there are two of the openings 7. The sack 9a is mounted in the pocket 5, in a way hereinbefore described in connection with the sack 9.

The fasteners may be mounted in place in various ways. In Figure 6, the fastener 19b is carried by a patch 50, which is vulcanized to the tab 14b, and all of the other fasteners may be mounted in a like manner.

Having thus described the invention, what is claimed is:—

The combination with a garment having a body and a lining and provided with an opening leading to the space between the body and the lining, of a sack in said space and including side walls, the side walls being provided upon their upper edges with upstanding tabs located at the end of the sack, and there being a downwardly extended slit in the end of the sack, between the side walls, the tabs being located at the edge of the opening in the garment, releasable fasteners connecting the tabs, respectively, with the lining and with the body of the coat, and a releasable fastener connecting the walls of the sack together at the slit and extended between.

In testimony that I claim the foregoing as my own, I have hereto affixed my signature.

RUBY SKELTON JENNINGS.